United States Patent [19]

Kano et al.

[11] Patent Number: 4,899,235
[45] Date of Patent: Feb. 6, 1990

[54] MAGNETIC TAPE LOADING MECHANISM AND METHOD

[75] Inventors: Kiyoshi Kano; Nobuyuki Kaku; Atsuo Osawa; Shinya Fujimori, all of Yokohama; Yoshihiro Fukagawa, Katsuta, all of Japan

[73] Assignees: Hitachi Video Engineering, Inc., Yokohama; Hitachi, Ltd., Tokyo, both of Japan

[21] Appl. No.: 152,377

[22] Filed: Feb. 4, 1988

[30] Foreign Application Priority Data

Feb. 10, 1987 [JP] Japan .................................. 62-29308

[51] Int. Cl.$^4$ .............................................. G11B 15/66
[52] U.S. Cl. ........................................ 360/85; 360/95; 360/96.5
[58] Field of Search ........................... 360/85, 95, 96.5

[56] References Cited

U.S. PATENT DOCUMENTS

| | | | |
|---|---|---|---|
| 4,697,215 | 9/1987 | Hata | 360/95 |
| 4,777,546 | 10/1988 | Nagasawa et al. | 360/85 |
| 4,796,115 | 1/1989 | Ohshima et al. | 360/85 |
| 4,802,034 | 1/1989 | Matsumoto et al. | 360/96.5 X |

FOREIGN PATENT DOCUMENTS 59-171070  9/1984  Japan .

Primary Examiner—John H. Wolff
Attorney, Agent, or Firm—Antonelli, Terry & Wands

[57] ABSTRACT

A tape loading mechanism for a video cassette recording apparatus in which a magnetic tape held in the cassette is withdrawn therefrom by a tape loading arm and is wound around a rotary cylinder. During this time, the cassette is fixed on the upper surface of a chassis having a cam bore, which is driven by a rotary arm in which a pin inserted in the cam bore is set up. This cam bore is provided with a first cam surface having a radius of curvature equal to that of a locus of a turning movement of the pin, a second cam surface formed continuously from the first cam surface and having a radius of curvature different from that of a locus of a turning movement of the pin, and a third cam surface formed continuously from the second cam surface and having a radius of curvature equal to that of a locus of a turning movement of the pin. Accordingly, the movement of the cassette is started at a predetermined period of time after the movement of the tape loading arm has been started, and it is completed before the movement of the tape loading arm has been completed.

9 Claims, 11 Drawing Sheets

STRAIGHT SLIDE

END OF STRAIGHT SLIDE

MAGNETIC TAPE LOADING MECHANISM AND METHOD

BACKGROUND OF THE INVENTION

This invention relates to magnetic tape loading mechanism and method for withdrawing a magnetic tape from a cassette which takes in rolled tape, and wind the resultant tape around a magnetic head-carrying rotary drum. The products to which the present invention applies include, for example, a video tape player (VTP), a video tape recorder (VTR) and a digital audio tape recorder.

There is a known VTR in which a cylinder is provided into the front opening of a tape cassette so that the cylinder overlaps the tape cassette. For example, Japanese Patent Laid-open No. 171070/1984 discloses this type of VTR.

FIGS. 1 and 2 roughly show the construction of a tape loading mechanism for the conventional VTR disclosed in Japanese Patent Laid-open No. 171070/1984.

FIG. 1 shows a non-loaded state, in which a tape has not yet been loaded on a cylinder, of the on which the tape loading has been completed and a cassette 4 are arranged in an overlapping manner, of the same tape loading mechanism.

The conventional tape loading mechanism shown in FIGS. 1 and 2 is provided with a first chassis 1, a second chassis 2, a cylinder 3, and tape withdrawing members (which will hereinafter be referred to as tape guides) 6a, 6b. The tape 5 is held in the cassette 4. The cassette 4 is provided with a front opening 4a.

In order to shift the unloading mode of FIG. 1 to the loading mode of FIG. 2 (this operation will hereinafter be referred to as a loading operation), the tape 5 is withdrawn from the front opening 4a of the cassette 4 by the two tape withdrawing guides 6a, 6b toward both the left and right sides of the cylinder 3 and wound around the cylinder 3 as much as a predetermined angle (this operation will hereinafter be referred to as a tape loading operation). During this time, the second chassis 2 on which the cassette 4 is placed slides linearly along grooves (not shown) in the side portions of the chassis 2 over the upper surface of the first chassis 1 on which the cylinder 3 is set, so that the cassette 4 is disposed so as to overlap the cylinder 3 at the opening 4a of the cassette 4.

The specification of Japanese Patent Laid-open No. 171070/1984 discloses an embodiment in which the second chassis starts sliding simultaneously with a tape loading operation, and an embodiment in which the second chassis starts sliding after the completion of a tape loading operation.

A loading mechanism shown in FIG. 2 is a so-called M-loading type tape loading mechanism in which a tape is wound around a cylinder in the left and right directions thereof.

There are some other loading systems, for example, τ- and u-loading systems developed by reducing the height of the tape path and the tape running load in the above M-loading system.

The outline of a tape loading mechanism for the τ-loading system is shown in FIG. 3. In the tape loading mechanism for the τ-loading system, a tape loading guide 6a hooks a tape 5 and move to a catcher 15a, while a tape loading guide 6b moves after the tape loading guide 6a to a catcher 15b.

The routes of movements of two tape guides 6a, 6b in the M- and τ-loading systems will now be compared. When the tape loading is ready to be started, the two tape withdrawing guides 6a, 6b are all held in the front opening 4a of the cassette so that the tape 4 can be withdrawn thereby in both of these loading systems. When a tape loading operation is started, the two tape withdrawing guides 6a, 6b move to right and left, respectively, to load the tape in a laterally divided manner on the cylinder in the M-loading system, so that the tape guides 6a, 6b run out of the opening 4a in the front portion of the cassette speedily. In the τ-loading system, the two tape withdrawing guides 6a, 6b move out to the same side of the cylinder, so that, especially the rear tape guide 6b with respect to the tape loading direction necessarily moves within the opening 4a in the front portion of the cassette for a predetermined period of time during the initial part of the tape loading operation.

Therefore, when the second chassis 2 in the τ-loading system starts sliding simultaneously with the starting of a tape loading operation in the same manner as in the first embodiment of the invention disclosed in Japanese Patent Laid-open No. 171070/1984, the rear tape guide 6b contacts the side surface 4b of the opening 4a at the front portion of the cassette 4 to obstruct the tape loading operation.

In the case where the second chassis 2 starts sliding after the completion of a tape loading operation, the following problems arise.

(i) A total period of time required for carrying out a tape loading operation becomes equal to the sum of the tape loading time and chassis sliding time, i.e., it becomes longer.

(ii) Since the second chassis 2 starts sliding after a tape loading operation has been completed, it is necessary that the slackening of the loaded tape be prevented. Therefore, the tape must be taken up at the same time that the sliding of the chassis is done.

According to the above-described conventional techniques, the second chassis 2 is slid by driving a rack 2a, which is provided thereon, by a pinion 12 provided on the first chassis 1. However, in this tape loading system, backlash between the rack 2a and pinion 12 and an error of rotation occur. Consequently, the precision of positioning of the second chassis 2 in the sliding direction during a tape unloading operation and at the time of completion of a tape loading operation decreases to a low level. This often causes erroneous operations of a brake and a mode control member (not shown) the operations of which need be transmitted from an operating member on the first chassis to a member to be operated which is provided on the second chassis 2. Namely, the conventional tape loading system has problems with respect to its reliability.

The inventions having relation to the present invention include the inventions disclosed in the following publications.

U.S. Pat. No. 4,611,251, U.S. Pat. No. 748,521, U.S. Pat. No. 4,4,789,912, U.S. patent application Ser. No. 925,908 (filed in November 1986).

SUMMARY OF THE INVENTION

An object of the present invention is to provide a tape loading mechanism and method which are capable of preventing a loading arm and a cassette from colliding with each other when a tape is withdrawn from the cassette.

Another object of the present invention is to provide a cassette-moving tape loading system capable of reducing the time required to carry out a tape loading operation.

Still another object of the present invention is to provide a tape loading mechanism in which the winding of a tape immediately after the loading thereof is not done.

A further object of the present invention is to provide a tape loading mechanism capable of moving a cassette with a high accuracy.

The tape loading mechanism according to the present invention consists of a rotary cylinder on which a magnetic head is provided, a means of cassette arrangement on which a wound magnetic tape-carrying cassette is set, a tape loading mechanism having a tape loading arm and adapted to withdraw the magnetic tape from the cassette by the tape loading arm and wind the magnetic tape around the rotary cylinder, and a cassette loading mechanism adapted to start moving the cassette toward the rotary cylinder a predetermined period of time after the starting of movement of the tape loading arm and complete the movement of the cassette before the completion of movement of the tape loading arm.

The tape loading method according to the present invention consists of a first step of setting a wound magnetic tape-carrying cassette on a means of cassette arrangement provided in opposition to a rotary cylinder, a second step of withdrawing the magnetic tape from the cassette and wind it around the rotary cylinder, and a third step of moving the cassette toward the rotary cylinder, the third step being started a predetermined period of time after the second step has been started, the second step being completed a predetermined period of time after the third step has been completed.

BRIEF DESCRIPTION OF THE DRAWINGS

FIGS. 12–6 illustrate the operation of a second chassis provided with a cam bore 11 of another shape in the tape loading mechanism according to the present invention.

DESCRIPTION OF THE PREFERRED EMBODIMENTS

Figure 1:
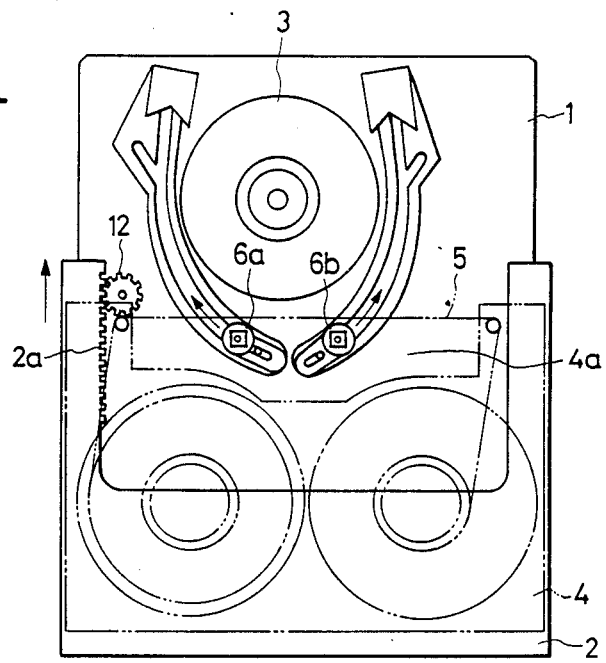
FIGS. 1–3 are plan views of conventional tape loading mechanism.
Figure 2:
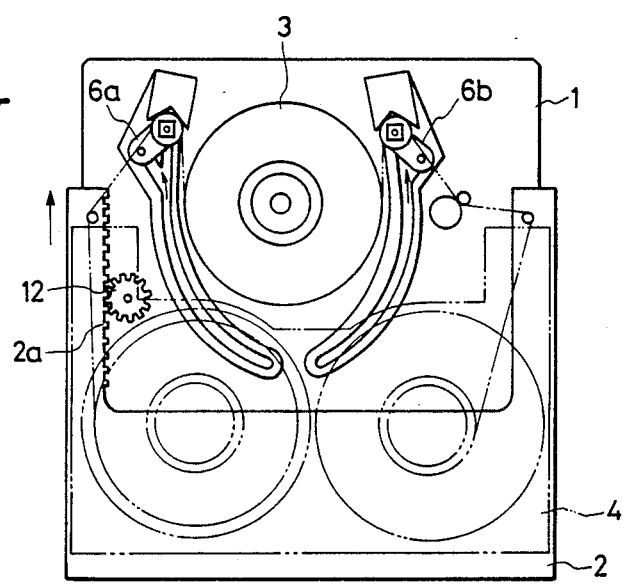
Figure 3:
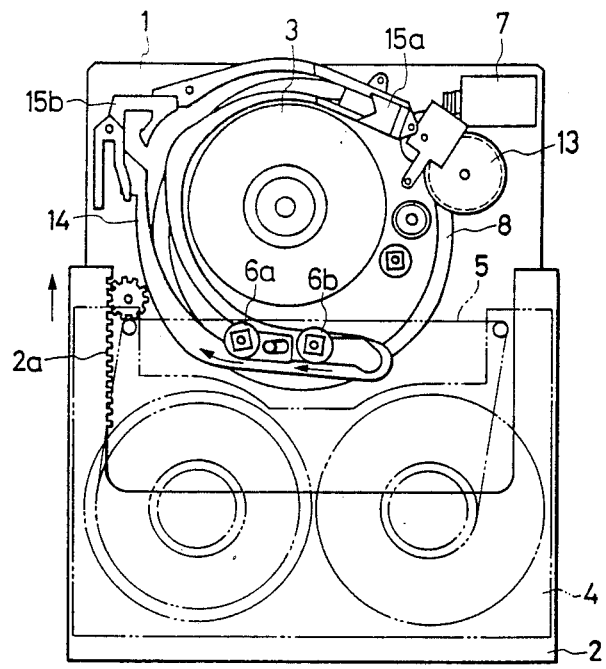
Figure 4:
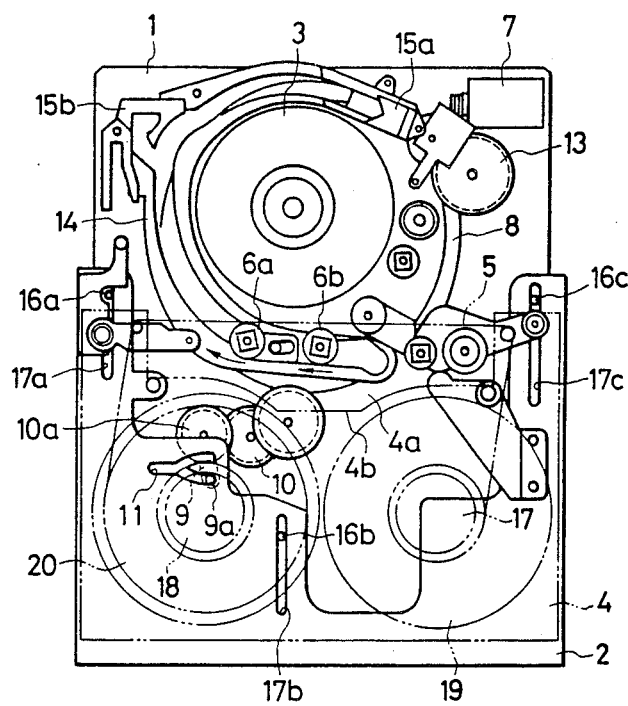
FIGS. 4–6 are plan views of the tape loading mechanism according to the present invention.
Figure 5:
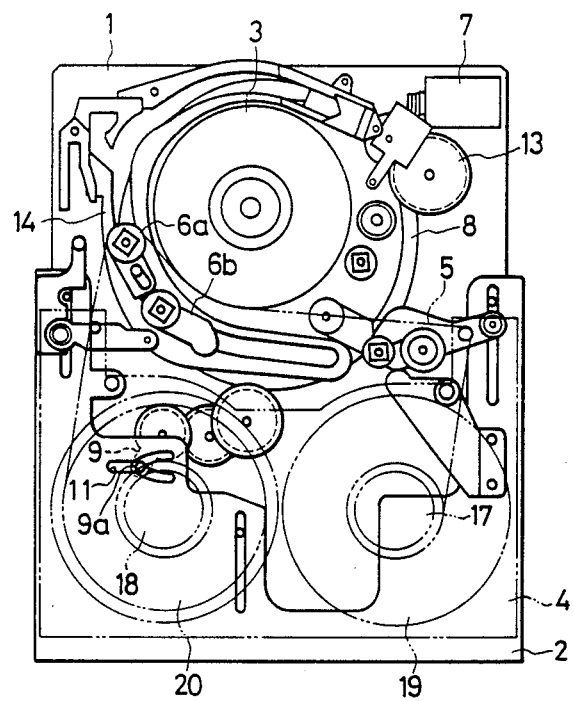
Figure 6:
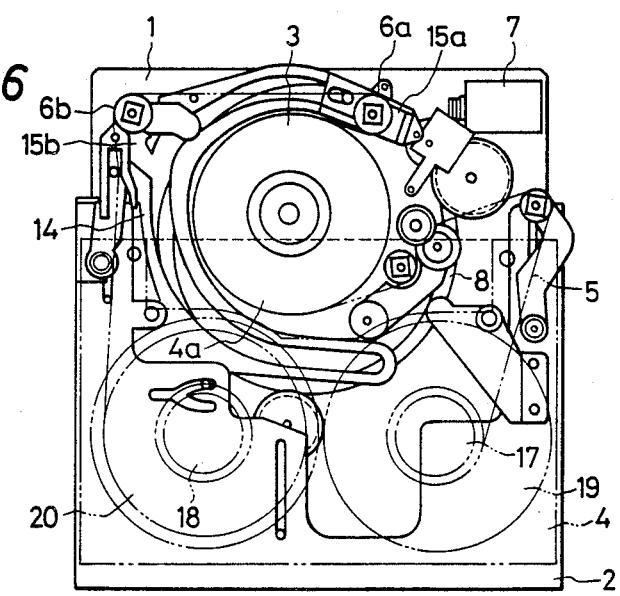

The tape loading mechanism according to the present invention is shown in FIGS. 4–6. FIG. 4 shows the tape loading apparatus in a tape non-loaded state, FIG. 5 the same mechanism with the tape being loaded, and FIG. 6 the same mechanism in a loading-completed state.

The tape loading mechanism according to the present invention is provided with a first chassis 1, a second chassis 2, a cylinder 3, a tape withdrawing drawing guide 6, a loading motor 7, a loading ring gear 8 and a pivotable arm 9.

The cassette 4 is supported on the second chassis 2 with the height of the cassette set to a predetermined level. A tape 5 is wound in the cassette 4. The reel bases 17, 18 are caught in reels 19, 20 in the cassette 4, and the reels 19, 20 are driven by the reel bases 17, 18.

First, the outline of a mechanism for moving the tape withdrawing guides 6a, 6b will be described.

A driving motor consists of the loading motor 7 provided on the first chassis, and the loading motor 7 is adapted to turn the loading ring gear 8, which is provided pivotably on the first chassis, via a relay gear train 13. The tape withdrawing guides 6a, 6b are connected to the loading ring gear 8 and moved therewith along a guide rail 14 in accordance with the turning of the loading ring gear 8. When the loading of the tape has been completed, the tape withdrawing guides 6a, 6b are held on the catchers 15a, 15b to form a tape path.

The outline of a mechanism for moving the second chassis 2 will now be described.

A driving motor for the second chassis consists of the loading motor 7 which also serves as a driving motor for the tape withdrawing guides 6a, 6b as mentioned above. The rotational force of the loading motor 7 is transmitted to a relay gear train 10 via the relay gear train 13 and loading ring gear 8 to turn the same gear train 10. A final one of the driving gear 10a in the relay gear train 10 is provided with an arm 9 formed integrally therewith, and a driving pin 9a is provided at the free end portion of the arm 9. The driving pin 9a is caught in a cam bore 11 provided in the second chassis 2. The second chassis 2 is caught at the elongated bores 17a, 17b, 17c, which extend toward the cylinder 3, with three holding pins 16a, 16b, 16c set up in the first chassis, in such a manner that the second chassis held movable only toward and away from the cylinder 3. Owing to this arrangement, the rotary movement of the final gear 10a is converted into a straight motion of the second chassis 2.

The relation of the operations of the tape withdrawing guides 6a, 6b and that of the second chassis 2 with respect to the time will now be described with reference to FIGS. 4, 5 and 6 as well as FIGS. 7–11.

Figure 7:
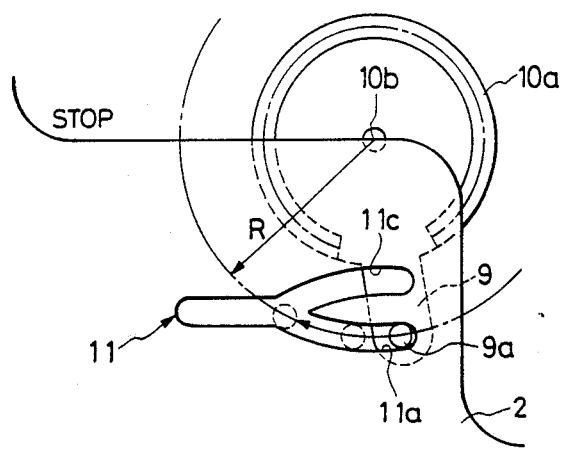
FIGS. 7–11 illustrate the operation of a second chassis in the tape loading mechanism according to the present invention.

FIGS. 7–11 are partial plan views showing the portion of the tape loading mechanism according to the present invention which is in the vicinity of the final one of the driving gear 10a and the cam bore 11 in the second chassis 2. In these drawings, the constituent elements corresponding to any of those shown in FIG. 4 are designated by the same reference numerals. FIG. 7 shows the mentioned portion of the mechanism at the time of the unloading of the tape, and FIG. 11 the same portion at the time of completion of the loading of the tape, FIGS. 8, 9 and 10 sequentially showing the intermediate stages of the tape loading operation. The details of a tape loading operation from a tape non-loaded stage to a loading-completed stage will now be described.

Referring to FIG. 4, the tape withdrawing guides 6a, 6b are held in the front opening 4a of the cassette 4 so that the tape 5 can be withdrawn thereby. The second chassis is in the most distant position in the direction of the movement thereof and with respect to the cylinder 3, and the cassette 4 and cylinder 3 have positional relation in which they are not yet moved to horizontally overlap each other. Referring to FIG. 7, the cam bore 11 is shaped as an English letter Y as illustrated therein, and the cam surfaces of arcuate sections 11a, 11c of a Y-shaped portion of the cam bore 11 are formed arcuately so as to have a radius of curvature equal to a radius R of rotation of the pin 9a on the arm 9. Since the width of the cam bore 11 is substantially equal to the diameter of the pin 9a, the pin 9a is caught in the cam bore 11 with no rattles occurring during the movement of the pin 9a. The pin 9a is at first positioned at the substantially right end of the arcuate section 11a, which is the lower arcuate section of the Y-shaped portion of the cam bore 11 in FIG. 7.

When a command signal for starting a loading operation is generated in the apparatus in this state, the loading motor 7 starts being rotated. Consequently, the loading ring gear 8 starts being turned clockwise in FIG. 4 around the cylinder 3, and the tape withdrawing guides 6a, 6b connected to the loading ring gear 8 starts moving clockwise along the guide rail 14 around the cylinder 3. During this time, the front tape withdrawing guide 6a moves speedily out of the opening 4a at the front portion of the cassette since the apparatus employs a one-way loading system as mentioned above, while the rear tape withdrawing guide 6b moves within the opening 4a for a predetermined period of time during an initial stage of movement thereof.

The loading ring gear 8 is driven clockwise around the cylinder 3 as shown in FIG. 7, and the arm 9 is also set pivotable in the clockwise direction around the center 10b. When the apparatus is in the condition of FIG. 7, the center of the arcuate section 11a of the cam bore 11 is set so as to agree with the center of rotation of the pin 9a. Accordingly, the pin 9a is turned in the arcuate section 11a of the cam bore 11 with the second chassis 2 left stopped until the pin 9a has reached the root of the Y-shaped portion.

Figure 8:
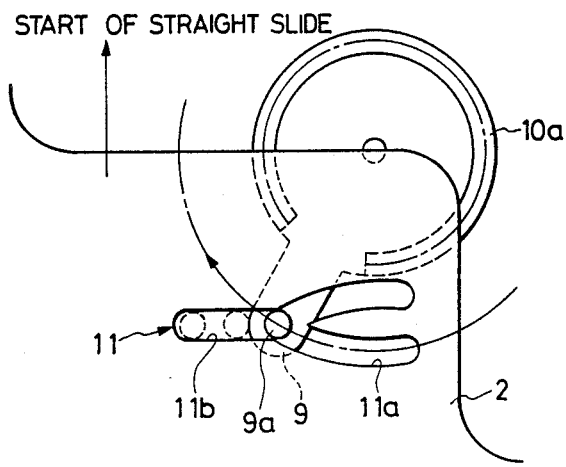

Since the pin 9a is driven by the loading motor 7, the driving motor therefor, via a plurality of gears, a certain degree of backlash inevitably occurs. Since the angle of rotation of the pin 9a between the position in FIG. 7 and that in FIG. 8 is sufficiently large as compared with the angle of this backlash, it is possible that such a degree of backlash be absorbed. Therefore, in this tape non-loading state, the second chassis 2 can be positioned in its sliding direction with a very high accuracy. Also, the range of allowable error of the initial position of the pin 9a in the direction of the rotation thereof can be set large during the assembling of the mechanism.

The tape withdrawing guides 6a, 6b move to the positions shown in FIG. 5, by the time the pin 9a has reached the position in FIG. 8. In this stage of the tape loading operation, the rear tape withdrawing guide 6b has already started moving out of the opening 4a of the cassette, the rear tape withdrawing guide 6b thereafter moving away from the cassette speedily. Accordingly, the second chassis 2 starts moving in the operational stage shown in FIG. 8 but the cassette 4 and tape withdrawing guides 6 do not contact each other.

In the operational stages shown in FIG. 8 onward, the pin 9a rotates and enters the linear section 11b of the cam bore 11 while moving the second chassis 2 in the upward direction in the drawing. During this time, the moving speed of the second chassis 2 is set to a level which does not cause the tape withdrawing guide 6b, which has started moving out of the opening 4a, to be overtaken by the cassette 4, and which does not thereby render the tape withdrawing operation inpracticable. During this time, a light load is applied to the reel base 18 on the feed side, and the reel base 17 on the take-up side is completely fixed.

As a result, the tape 5 is withdrawn from the feed side reel base 18 alone. During this time, the velocity at which the tape is withdrawn by the tape withdrawing guides 6a, 6b is set constantly higher than that at which the second chassis 2 is moved, until the end of the tape loading operation, so that the slackening of the tape does not occur during the tape loading operation.

Figure 9:
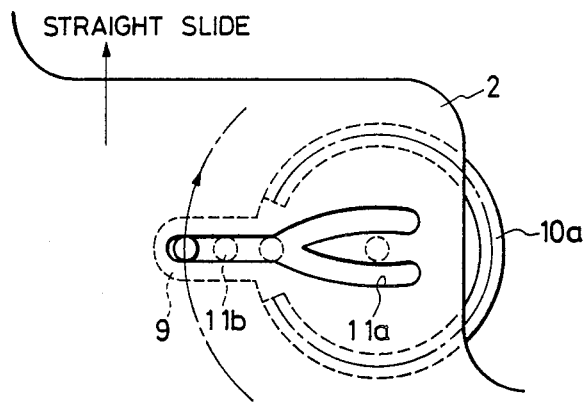
Figure 10:
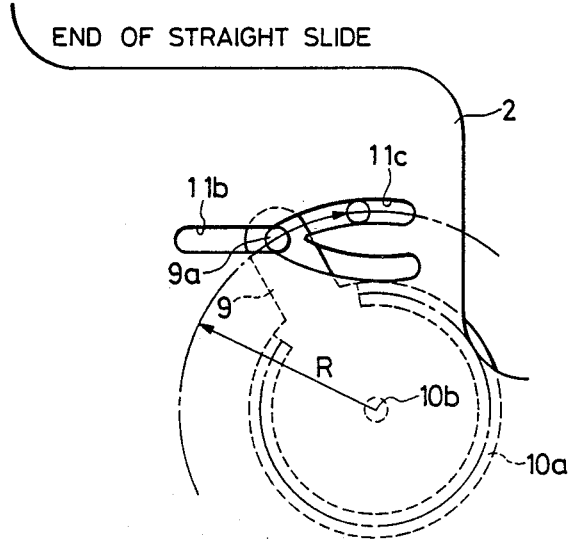

The pin 9a moves the second chassis 2 toward the cylinder 3 while the tape loading operation progresses from the operational stage shown in FIG. 8 to the operational stage shown in FIG. 10 through the operational stage shown in FIG. 9. Referring to FIG. 10, the center of the upper arcuate section 11c of the cam bore 11 is set so as to agree with the center 10b of rotation of the pin 9a as in the case of the arcuate section 11a shown in FIG. 11. The pin 9a is then rotated in the cam bore 11 with the second chassis 2 left stopped, until the tape loading operation has reached the operational stage shown in FIG. 10.

Figure 11:
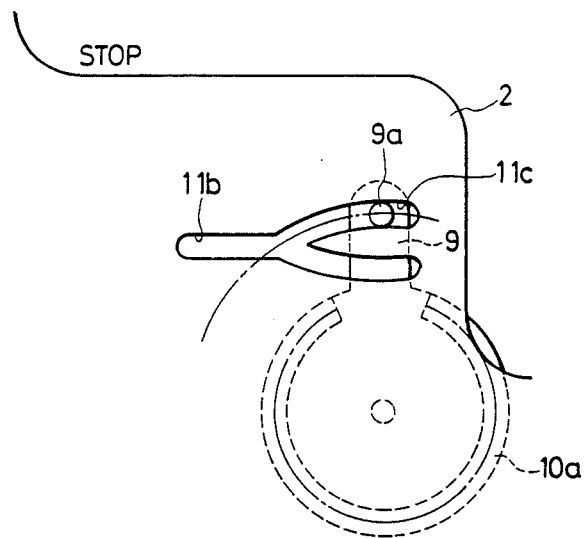
Figure 12:
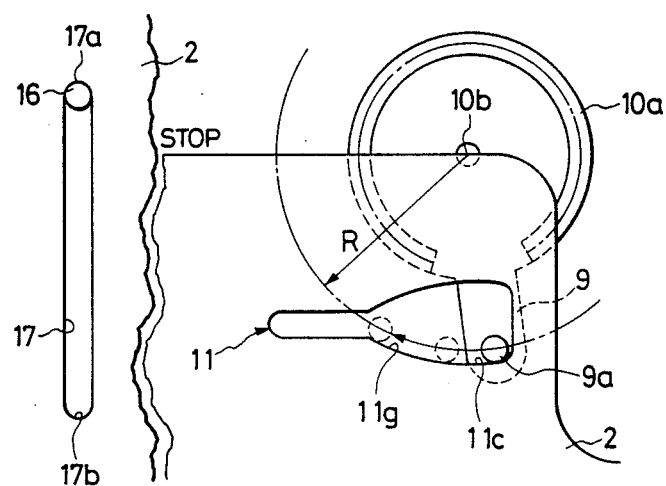

Thus, the positioning of the second chassis 2 in the direction of movement thereof at the time of completion of the tape loading operation is done with a high accuracy in the same manner as in the above-mentioned non-tape-loaded stage of the tape loading operation. A drawing of the mechanism as a whole in which the pin 9a reaches the operational stage shown in FIG. 11 is FIG. 6. In this operational stage, the tape withdrawing guides 6a, 6b are held to the catchers 15a, 15b, and a tape path is formed. The cassette 4 is disposed so that the opening 4a thereof horizontally overlaps the cylinder 3, and, accordingly, the depth (length in the vertical direction in the drawing) of the tape loading mechanism decreases.

Between the operational stages shown in FIGS. 10 and 11, the movement of the second chassis 2 has already been completed, and only the tape withdrawing guides 6a, 6b are moved. To minimize the tape loading time, it is clear that the completion of movements of the second chassis 2 and tape withdrawing guides 6a, 6b may be synchronized. However, in this embodiment, serious consideration is given to the precision of positioning of the second chassis 2 at the time of completion of the tape loading operation so as to enable the tape withdrawing guides 6a, 6b to be moved even after the second chassis 2 has been stopped.

The angle of rotation of the pin 9a from the operational stage shown in FIG. 10 to the operational stage shown in FIG. 11 is much smaller than that encountered during the whole tape loading time, and it does not greatly lengthen the tape loading time. Since the tape guides 6a, 6b are further moved, after the completion of the movement of the second chassis 2, to withdraw the tape, the occurrence of the slackening of the tape during the tape loading operation can be prevented more reliably.

It is possible to use a method of positioning the second chassis 2 with a higher precision, which is not employed in this embodiment, and which consists of the step of pressing the tape withdrawing guides 6a, 6b against the datum plane of the catchers 15a, 15b. During the positioning of the tape withdrawing guides and second chassis, a driving force far larger than that used while they are moved for other purposes is required. Therefore, if the completion of the movements of the tape withdrawing guides and second chassis 2, i.e. the positioning of these parts by pressing the same against the datum plane is synchronized so as to minimize the tape loading time as mentioned above, a load increased for this press-positioning operation is applied additionally during the same period to the driving motor (loading motor 7 in this embodiment) which is used to move the same guides and chassis. As a result, the required driving force of the driving motor extremely increases. This causes a great increase in the dimensions and weight of the driving motor and the mechanism as a whole. However, according to this embodiment, such inconveniences can be avoided since the positioning of the second chassis and tape withdrawing guides is done at different time.

A second embodiment of the present invention will now be described with reference to FIGS. 12-16. The construction of this embodiment is almost identical with that of the first embodiment. The difference between these two embodiments resides only in the shape of the cam bore 11 in the second chassis 2. Namely, the characteristics of the second embodiment reside in that the arcuate sections constituting the Y-shaped portion in the first embodiment are integrated into one large bore. The movements of the reduction gear 10a and arm 9 in the second embodiment are identical with those of the same parts in the first embodiment. The sequential stages of a tape loading operation shown in FIGS. 12-16 correspond to those of the tape loading operation shown in FIGS. 7-11. The drawings on the left side of the broken line portions of FIGS. 12-16 show the relative positional relation in various operational stages between the three elongated bores 17 in the second chassis 2 and support pins 16 shown in FIG. 4.

Figure 13:
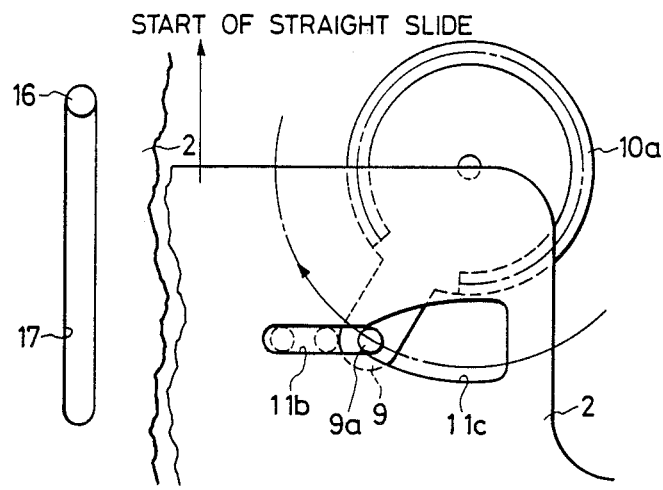
Figure 14:
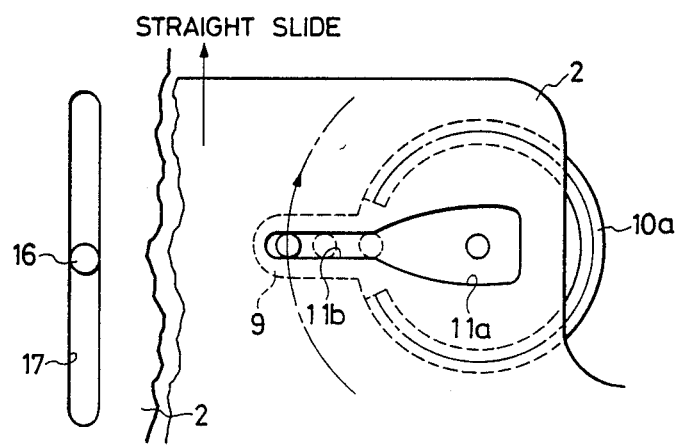
Figure 15:
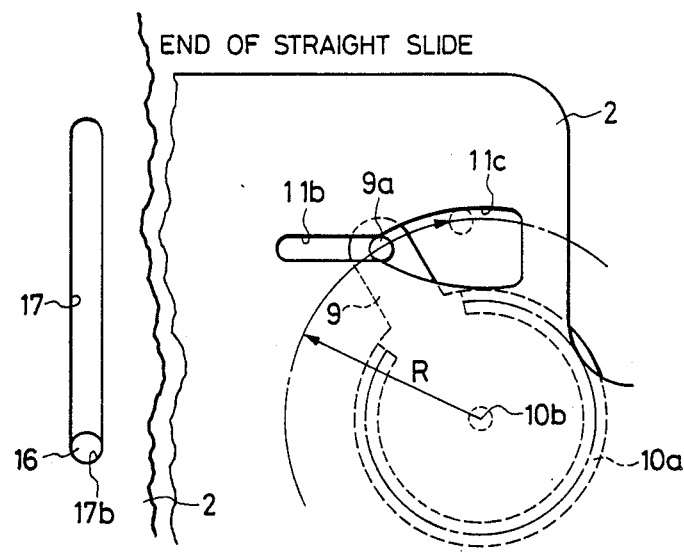

Although the operations shown in FIGS. 13-15 are identical with those in the first embodiment, the positioning system shown in FIGS. 12-13 and 15-16 is different from the corresponding system in the first embodiment. Namely, in FIGS. 12-13, the pin 9a slides along a lower arcuate end portion 11g, the diameter of which is set equal to that of a rotation of the pin 9a, of a cam bore to thereby restrict the vertical movement in the drawings of the second chassis 2. During this time, the support pin 16 is in a position in which the support pin 16 contacts the upper end 17a of the elongated bore 17 as shown in the left-hand side of the drawings, and the downward movement in the drawings of the second chassis 2 is restricted. As a result the second chassis 2 is positioned in one point in its sliding direction.

Figure 16:
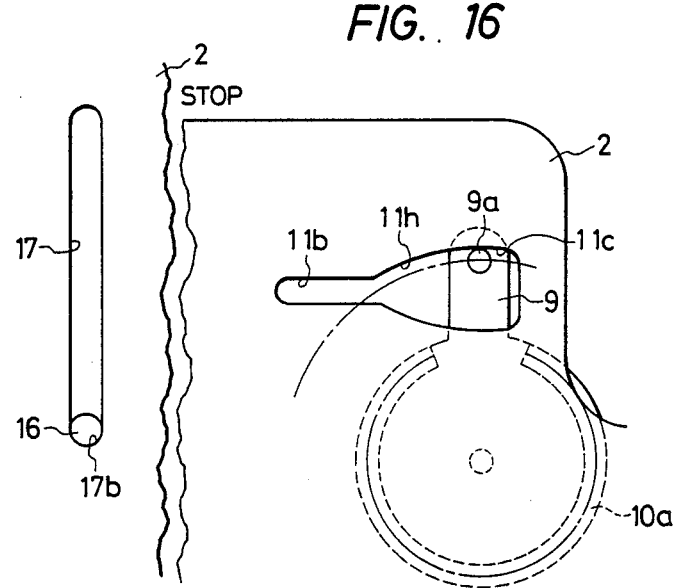
Figure 17:
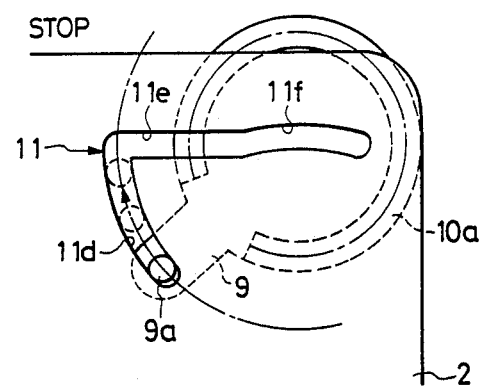
FIGS. 17–21 illustrate the operation of a second chassis provided with a cam bore of still another shape in the tape loading mechanism according to the present invention.
Figure 18:
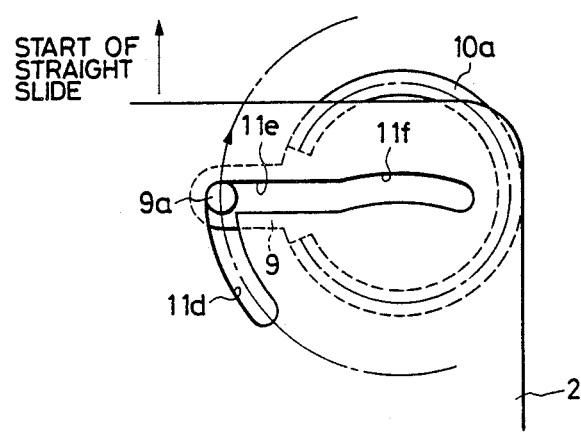
Figure 19:
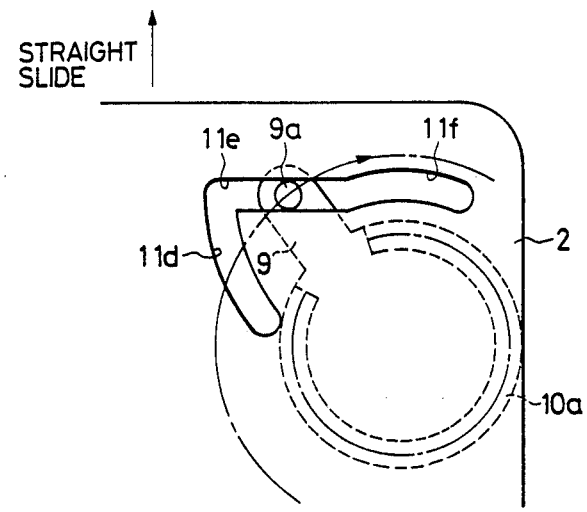
Figure 20:
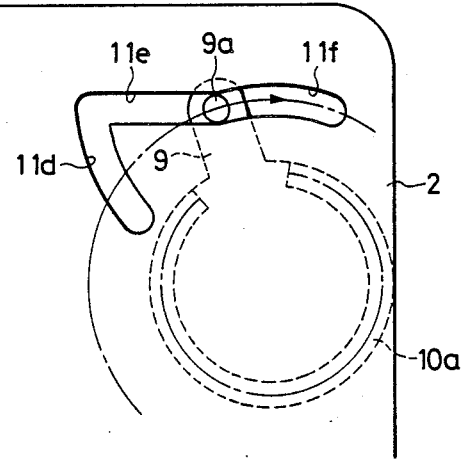
Figure 21:
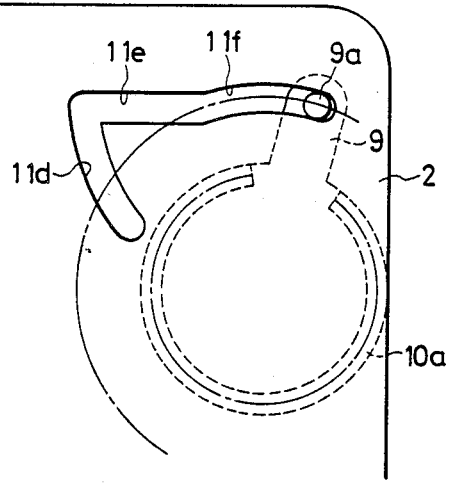

Conversely, in FIGS. 15 and 16, the pin 9a contacts the upper arcuate end portion 11h of the cam bore 11, so that the downward movement in the drawings of the second chassis 2 is restricted, and, since the support pin 16 contacts the lower end 17b of the elongated bore 17, the upward movement of the second chassis 2 is restricted. Consequently, the second chassis 2 is positioned in one position in its sliding direction in the same manner as mentioned above.

A third embodiment of the present invention will now be described with reference to FIGS. 17-21. The construction of this embodiment is identical with that of the first embodiment, and the difference between the third and first embodiments resides in only the shape of the cam bore 11 in the second chassis 2. The cam bore 11 in the third embodiment is characterized in that it is formed so as to have two arc portions 11d, 11f and a linear portion 11e which are connected in series as shown in the drawings.

The movements of the relay gear 10 and arm 9 in this embodiment are identical with those of the corresponding parts in the first embodiment, and the operational sgages shown in FIGS. 17-21 correspond to those shown in FIGS. 7-11 in the mentioned order. Namely, in the operational stages shown in FIGS. 17-18, the pin 9a rotates in the arc portion 11d which is formed so as to have a radius equal to the radius of rotation of the pin 9a. During this time, the second chassis 2 is kept in a stop mode and positioned in its sliding direction. The second chassis 2 moves slidingly between the operational stages shown in FIGS. 18-20. In the operational stages shown in FIGS. 20-21, the pin 9a is rotated in the arc portion 11f formed so as to have a radius equal to the radius of the rotation of the pin 9a, and the second chassis 2 is kept in a stop mode, and positioned properly.

According to the present invention, tape loading mechanism and method which are capable of preventing a collision of the loading arm with the cassette when the tape is withdrawn from the cassette can be provided, and a VTR can be miniaturized.

The present invention is also capable of reducing the time required to carry out a tape loading operation, and moving the cassette with a high accuracy.

What is claimed is:

1. A magnetic tape cassette loading mechanism comprising a rotary cylinder on which a magnetic head is provided, cassette receiving means on which a magnetic tape-carrying cassette is to be set, a tape loading mechanism having a tape loading arm and being adapted to withdraw said magnetic tape from said cassette by said tape loading arm and wind said magnetic tape around said rotary cylinder, a cassette moving mechanism adapted to start moving said cassette toward said rotary cylinder a predetermined period of time after the starting of movement of said tape loading arm and complete the movement of said cassette before the completion of movement of said tape loading arm, and supporting means having a first chassis for supporting said rotary cylinder, said cassette receiving means, said tape loading mechanism and said cassette moving mechanism.

2. A magnetic tape cassette loading mechanism according to claim 1, wherein said cassette receiving means has a second chassis having a cam bore and which is supported on said first chassis of said supporting means so that said second chassis can be moved toward said rotary cylinder.

3. A magnetic tape cassette loading mechanism according to claim 2, wherein said cassette moving mechanism is provided with a rotary arm on which a pin inserted in the cam bore in said second chassis is set up.

4. A magnetic tape cassette loading mechanism according to claim 3, wherein said cam bore is provided with a first cam surface the radius of curvature of which is equal to that of a locus of a turning movement of said pin, a second cam surface formed continuously from said first cam surface and having a radius of curvature different from that of a locus of a turning movement of said pin, and a third cam surface formed continuously from said second cam surface and having a radius of curvature equal to that of a locus of a turning movement of said pin.

5. A magnetic tape cassette loading mechanism according to claim 1, wherein said cassette consists of a housing provided with a magnetic tape feed reel, a take-up reel, and an opening.

6. A magnetic tape cassette loading mechanism according to claim 5, wherein said loading arm in said tape loading mechanism is moved toward said rotary cylinder through said opening of said cassette.

7. A magnetic tape cassette loading mechanism according to claim 6, wherein said cassette moving mechanism is adapted to start moving toward said rotary cylinder after said loading arm has passed through said opening of said cassette.

8. A magnetic tape cassette loading mechanism according to claim 7, wherein said cassette moving mechanism is adapted to move said cassette to a position in which one end portion of said cassette horizontally overlaps said rotary cylinder.

9. A tape loading method comprising a first step of setting a magnetic tape-carrying cassette on a of cassette receiving means provided in opposition to a rotary cylinder, a second step of withdrawing said magnetic tape from said cassette and winding the same around said rotary cylinder, and a third step of moving said cassette toward said rotary cylinder, said third step being started a predetermined period of time after said second step has been started, said second step being completed a predetermined period of time after said third step has been completed.

* * * * *